April 25, 1950

T. H. SCHAEFER 2,505,305

SINK STRAINER AND TRAP

Filed April 26, 1947

INVENTOR
Thomas H. Schaefer
By Adam E. Fisher
ATTORNEY

Patented Apr. 25, 1950

2,505,305

UNITED STATES PATENT OFFICE 2,505,305

SINK STRAINER AND TRAP

Thomas H. Schaefer, St. Louis, Mo.

Application April 26, 1947, Serial No. 744,181

2 Claims. (Cl. 4—289)

My invention relates to improvements in sink strainers and traps.

The primary object of my invention is to provide a combination unit which will serve both as a strainer and as a trap for a sink, lavatory or the like, and which will perform both functions in an effective manner.

Another object is to provide a unit of this kind wherein is embodied an outer housing open at its top to receive the waste water from the sink and having a pipe at its bottom to discharge the water to the sewer, there being two telescoping strainer buckets or members seated in the housing to strain out foreign matter from the water as it passes through and the outer one of these buckets being perforated while the inner one is reticulated so as to strain out even the finest particles from the water.

Another object is to provide a unit as above wherein the discharge pipe is extended above the level of the bottom of the housing, causing a quantity of water to stand at all times in the bottom of the housing forming a water seal or trap as will be evident. The outermost bucket then extends down into this water seal and has its lower end portion closed at a point above the seal so that no obnoxious gases or the like can flow upward to the sink.

Still a further object is to provide a unit of this kind wherein the strainer buckets are readily removable for cleaning.

These and still more specific objects will be made apparent in the course of the following detailed description, reference being had to the accompanying drawing, wherein.

Figure 1:
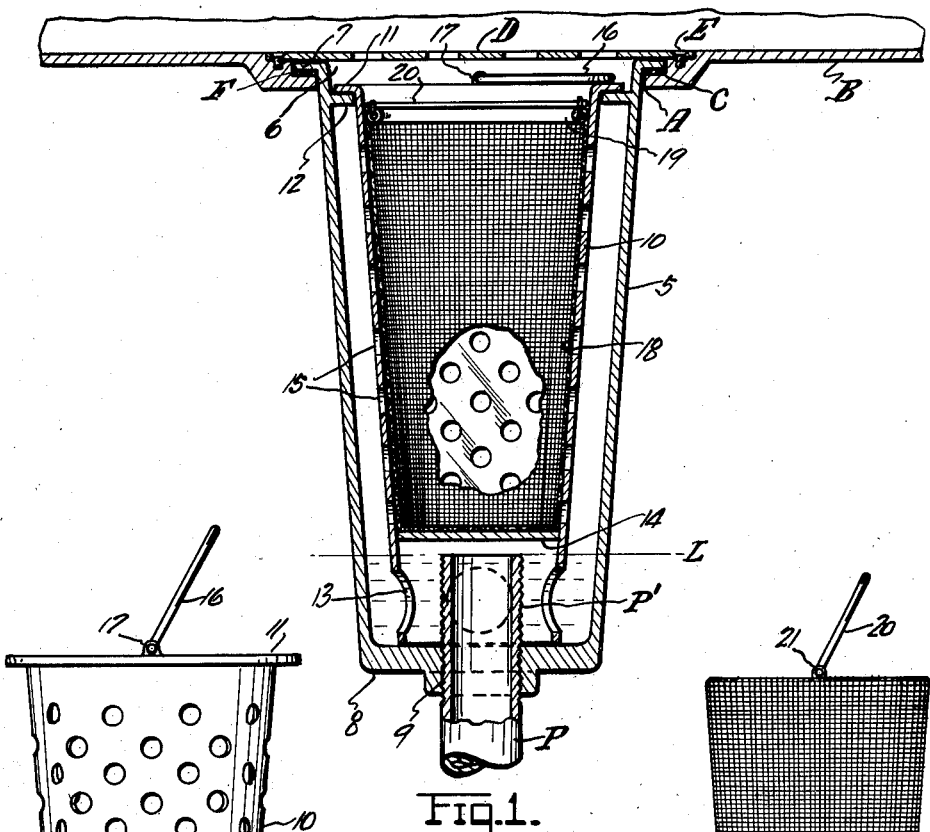
Figure 1 is a vertical, diametrical section through the unit as applied to a sink, only a fragment of the latter being shown.
Figure 3:
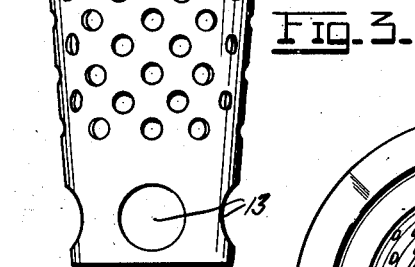
Figure 3 is an elevation of the outer bucket alone.
Figure 2:
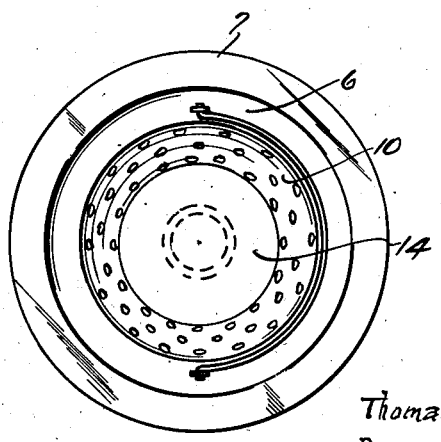
Figure 2 is a plan view of the unit above.
Figure 4:
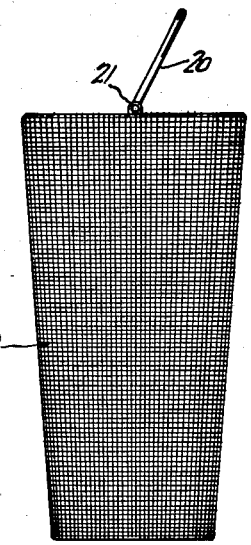
Figure 4 is an elevation of the inner bucket alone.

In carrying out my invention, I provide the housing or casing 5 of substantially cylindrical form having an open upper end 6 with a radially turned and circumferentially extended flange 7 and the lower end 8 closed except for a central tapped aperture 9. As shown in the drawings, the housing 5 is tapered to decrease in diameter downwardly but this formation is not functionally necessary.

The housing is adapted to be placed downwardly through the waste opening A of the sink B from which it depends and is supported by the flange 7 resting in the annular seat C. A perforated plate D is then removably mounted by screws E over the top of the housing and presses the flange 7 against a gasket F so as to form a water tight joint between the housing and sink and allow the waste water from the sink to run down into the housing. The waste pipe P is screwed in the opening 9 in the lower end 8 of the housing and carries the water off to the sewer (not shown). Attention may be directed here to the extension of the pipe above the level of the bottom 8 as indicated at P' which causes a quantity of water to stand at all times in the bottom of the housing as indicated by the water level line L extended flush with the top of the pipe.

While the unit is here shown and described as disposed immediately adjacent the sink, it will be readily apparent that it might be located at a remote point (as at the floor level) and connected by a pipe to the sink if so desired.

For mounting in the housing, I provide an outer strainer or strainer bucket 10 of tapered cylindrical form considerably smaller in diameter than the housing and provided at its open upper end with an exterior circumferential flange or rim 11. This rim 11 is adapted to rest on the annular shoulder 12 which is extended inwardly around the interior of the housing 5 some distance below the upper end 6 thereof. The lower end of the bucket 10 is adapted to extend into the water or water seal around the pipe extension P' and has spaced apertures 13 located below the water level L to permit the free flow of water into the lower part of the unit. A bottom plate 14 seals the lower portion of the bucket 10 but is spaced some distance above the water level as shown. Above this plate 14, the bucket has a plurality of spaced apertures or perforations as indicated at 15 and a bail 16 is pivotally mounted at 17 to the rim 11 so that it may lie flat thereon.

An inner strainer or strainer bucket 18 made entirely of screen wire is provided and is of such shape and size as to slip or telescope nicely into the outer strainer 10. The open upper end 19 of this strainer 18 is reinforced and has a bail 20 pivotally mounted as at 21 so as to fold down against the rim of the bucket.

In operation the waste water runs down into the strainer buckets 10 and 18 which allow it to flow out the sides into the housing 5 but strain out all foreign matter from the water. The strained water then flows through the apertures 13 and out through the pipe P.

The only outlet from the housing to the pipe P is through the apertures 13 which are located below the water level and thus no gases can arise from the pipe and through the trap.

When the buckets 10 or 18 become clogged, the plate D is removed and the buckets may be readily lifted out by their bails 16 and 20 for cleaning.

While I have herein set forth a certain preferred embodiment of my invention, it is understood that I may vary from the same in minor structural details, not departing from the scope of the appended claims.

I claim:

1. In a device of the kind described, for mounting down through an opening formed through the bottom of a sink, an elongated and downwardly tapered outer housing, open at the upper end and flanged outwardly thereat for seating in the said opening of the sink, the lower end of the housing being closed except for a central opening, and there being a flange extended inwardly around the walls of the housing and spaced downwardly from the upper end thereof, a drain pipe projected at its lower end through said opening in the lower end of the housing and sealed in place so that the upper end of this pipe is spaced above the lower end of the housing, an outer strainer bucket seated within the outer housing, said strainer bucket being also tapered and of lesser cross section than the outer housing, the upper end thereof being open and flanged outwardly around its margin for seating upon the inturned flange at the upper end of the outer housing, the lower end of this strainer bucket being extended down to the bottom of the outer housing and encircling the inwardly projected end of the drain pipe, there being a basal closure in the lower portion of the bucket at a point above the inner end of the inwardly projected drain pipe, the side walls of the bucket being perforated from top to bottom for passing particles of sewage therethrough down into the drain pipe, the liquid filler in the lower end of the outer housing forming a gas trap for gases and odors, and an inner strainer bucket of screen wire formed and tapered to fit within the said outer strainer bucket, and thus fitted therein.

2. In a device according to claim 1, a perforated closure plate for the mouth of the opening in the bottom of the sink, and bails pivotally attached to the upper ends of the outer and inner strainer buckets for facilitating handling same.

THOMAS H. SCHAEFER.

REFERENCES CITED

The following references are of record in the file of this patent:

UNITED STATES PATENTS

| Number | Name | Date |
|---|---|---|
| 852,044 | Vander Minden | Apr. 30, 1907 |
| 1,035,733 | Pierce | Aug. 13, 1912 |

FOREIGN PATENTS

| Number | Country | Date |
|---|---|---|
| 36,469 | Netherlands | Sept. 16, 1935 |